US012780977B2

(12) United States Patent
Ma

(10) Patent No.: US 12,780,977 B2
(45) Date of Patent: Nov. 3, 2026

(54) AQUEOUS POLYURETHANE DISPERSION

(71) Applicant: Urethane Systems USA LLC, Perth Amboy, NJ (US)

(72) Inventor: Tungchan Ma, Fort Lee, NJ (US)

(73) Assignee: Urethane Systems USA LLC, Perth Amboy, NJ (US)

( * ) Notice: Subject to any disclaimer, the term of this patent is extended or adjusted under 35 U.S.C. 154(b) by 365 days.

(21) Appl. No.: 18/282,449

(22) PCT Filed: Mar. 18, 2022

(86) PCT No.: PCT/US2022/020946

§ 371 (c)(1),
(2) Date: Sep. 15, 2023

(87) PCT Pub. No.: WO2022/198046

PCT Pub. Date: Sep. 22, 2022

(65) Prior Publication Data

US 2024/0158562 A1 May 16, 2024

Related U.S. Application Data

(60) Provisional application No. 63/163,304, filed on Mar. 19, 2021.

(51) Int. Cl.

*C09D 175/12* (2006.01)
*C08G 18/08* (2006.01)
*C08G 18/12* (2006.01)
*C08G 18/32* (2006.01)

(52) U.S. Cl.

CPC ......... *C08G 18/12* (2013.01); *C08G 18/0866* (2013.01); *C08G 18/3275* (2013.01); *C09D 175/12* (2013.01); *C08G 2150/00* (2013.01); *C08G 2170/00* (2013.01); *C08G 2190/00* (2013.01)

(58) Field of Classification Search

CPC .. C08G 18/12; C08G 8/0866; C08G 18/3275; C09D 175/12

See application file for complete search history.

(56) References Cited

U.S. PATENT DOCUMENTS

| | | | |
|---|---|---|---|
| 3,479,310 | A | 11/1969 | Dieterich et al. |
| 5,692,937 | A | 12/1997 | Zhang |
| 5,965,195 | A | 10/1999 | Muller et al. |
| 7,825,210 | B2 | 11/2010 | Steidl et al. |
| 2006/0205869 | A1 | 9/2006 | Steidl et al. |
| 2007/0260022 | A1 | 11/2007 | Casteren |
| 2009/0264577 | A1 | 10/2009 | Blum et al. |
| 2011/0306724 | A1 | 12/2011 | Campbell et al. |
| 2018/0022854 | A1 | 1/2018 | Blaisdell et al. |
| 2018/0194964 | A1 | 7/2018 | Zhao et al. |

FOREIGN PATENT DOCUMENTS

| | | | |
|---|---|---|---|
| CN | 105176364 | A | * 12/2015 |
| CN | 111171272 | A | 5/2020 |
| DE | 1495847 | A1 | 5/1969 |
| EP | 2 848 637 | A1 | 3/2015 |
| JP | 2011-140647 | A | 7/2011 |
| JP | 2015-163714 | A | 9/2015 |
| WO | 2017137237 | A1 | 8/2017 |

OTHER PUBLICATIONS

CN-105176364-A_2015-12-23_English Translation.*
Pandya, H. et al. "Fundamental insight into anionic aqueous polyurethane dispersions" Advanced Industrial and Engineering Polymer Research 3 (2020) pp. 102-110.
International Search Report from corresponding international application PCT/US2022/020946, dated Jun. 2, 2022, WO pages.
Pandya, H. Mahanwar, P. ,Advanced Industrial and Engineering Polymer Research 3 (2020) pp. 102-110, available on the the Internet at www.sciencedirect.com/science/article/pii/S2542504820300270.
Combined Chinese Office Action and Search Report issued Apr. 23, 2026 in Chinese Patent Application No. 202280022427.4 (with English translation of Search Report only), 11 pages.
Japanese Office Action issued Feb. 3, 2026 in Japanese Patent Application No. 2023-557186 (with English translation), 7 pages.

* cited by examiner

*Primary Examiner* — Michael L Leonard
(74) *Attorney, Agent, or Firm* — Oblon, McClelland, Maier & Neustadt, L.L.P.

(57) ABSTRACT

An aqueous polyurethane dispersion may be prepared by a process including: (i) forming an NCO-terminated polyurethane prepolymer from a reaction mixture of (a) polyol(s), (b) anionic internal surfactant(s), (c) dimethylethanolamine or diethylethanolamine, and (d) polyisocyanate(s), preferably aliphatic, cycloaliphatic or aromatic di- or triisocyanates(s); (ii) dispersing the polyurethane prepolymer into a continuous aqueous phase under application of shear forces, preferably by mechanical stirring, to obtain a prepolymer dispersion; and (iii) reacting the prepolymer dispersion with chain extension agent(s) to obtain an aqueous polyurethane dispersion. The anionic internal surfactant may include a first and second NCO-reactive groups and a negatively charged functional group, preferably a carboxyl group. The polyisocyanate may be used in molar excess relative to the isocyanate groups to the NCO-reactive groups and hydroxyl groups of the other components of the reaction mixture. Stages (i), (ii), and (iii) may be carried out in the absence of organic solvent.

20 Claims, No Drawings

AQUEOUS POLYURETHANE DISPERSION

CROSS-REFERENCE TO RELATED APPLICATIONS

The present application is the national stage of international application PCT/US2022/020946, filed on Mar. 18, 2022, and claims the benefit of the filing date of U.S. Prov. Appl. No. 63/163,304, filed on Mar. 19, 2021, the content of each of which is incorporated by reference.

FIELD OF THE DISCLOSURE

The present invention relates to an aqueous polyurethane dispersion, a process for preparing the same, a composition comprising the same, a coating comprising the same, and a coated article obtained by coating an article with the coating.

BACKGROUND OF THE INVENTION

Aqueous polyurethane dispersions are widely used in coatings, adhesives, sealants and printing inks. The formulation of Aqueous polyurethane dispersions involves many components namely, polyols, isocyanates, chain extension agents, and ionic centers which enable the polyurethane to be dispersed in water. Aqueous polyurethane dispersions are by far the most common available commercially. Several processes are known in the art that can be used to prepare aqueous polyurethane dispersions. Known methods include, for example, the acetone method, the prepolymer mixing method, the emulsifier/shear force method, the melt emulsification method, the ketoimine method and the solid spontaneous dispersion method. The methods are summarized in Methoden der organischen Chemie (Houben-Weyl. 4.Auflage, Volume E20, H Bartl, J. Falbe, Stuttgart, New York, Thieme 1987, p. 1671-1682 and H. Pandya, P. Mahanwar; Advanced Industrial and Engineering Polymer Research 3 (2020) 102-110.

The acetone process, analogous to the teaching of U.S. Pat. No. 3,479,310 and DE1,495,847 is particularly important. In this process, an NCO-terminated polyurethane prepolymer is initially prepared, then dissolved in an inert solvent and finally chain-extended in solution to form the relatively high molecular weight polyurethane. The incorporation of the hydrophilic groups required for dispersion is preferably achieved either by incorporating diols containing ionic, potentially ionic or non-ionic hydrophilic groups in the prepolymer or by using corresponding amines as chain-extending agents. Dispersion is carried out discontinuously in vessels equipped with stirrers and, optionally, baffles. The solvent used is generally distilled off from the vessel immediately after dispersion in water.

In the prepolymer mixing method, initially a polyurethane prepolymer is manufactured by reacting polyisocyanate, polyol and an anionic internal surfactant, sometimes in the presence of a solvent and/or a reactive diluent. The anionic internal surfactant is included in the polymer backbone chain or is pendant from the polymer backbone. This anionic internal surfactant is typically dimethylol propionic acid (DMPA), a molecule containing two hydroxyl group and a carboxylic acid group. The hydroxyl groups react with the isocyanate groups to produce an NCO terminated prepolymer with a pendant carboxyl group. This prepolymer is dispersed under shear force in water, optionally with or without a surfactant or emulsifier, with a suitable volatile neutralizing agent such as trimethylamine (TEA). The neutralizing agent reacts with the carboxyl group of DMPA to form a salt which is water soluble. Afterwards, diamine or triamine chain extender is added to produce a finished polyurethane dispersed in water with no free NCO groups.

U.S. Pat. No. 5,692,937 discloses aqueous dispersions of a polyurethane ionomer reaction product of polyester polyol (such as poly(diethylene glycol adipate)), aliphatic diisocyanate (such as IPDI), dimethylol propionic acid neutralized with a base selected from tertiary amines (such as triethaylamine) and alkali metal hydroxides.

U.S. Pat. No. 5,965,195 discloses a co-solvent-free, aqueous, anionic dispersion of polyurethane-ureas of an NCO prepolymer prepared from an aliphatic diisocyanate, a macrodiol, a 2,2-bis-(hydroxymethyl)alkane monocarboxylic acid and a diol having a Mw of 62 to 400, a monofunctional chain terminating agent, water and a neutralizing agent. Ammonia and dimethylethanolamine (2-(Dimethylamino) ethanol (DMAE) or N,N,-Dimethylethanolamine (DMEA)) are used as neutralizing agents.

WO2003/035710A1 discloses a hydroxyl-functional polyurethane dispersions prepared from polycarbonate polyol, IPDI, DMPA, butanediol, trimethylolpropane (TMP), diethanolamine (DEA) and TEA.

US2006/0205869 discloses solvent-free electrosterically stabilized polyurethane dispersion based on isophorone diisocyanate (IPDI), polypropylene glycol (PPG), 1,4-butanediol, dimethylpropionic acid (2,2-bis(hydroxymethyl)propionic acid; DMPA) and sodium hydroxide as a neutralizing agent.

US2011/0306724 discloses a solvent-free aqueous polyurethane dispersion comprising a polyurethane polymer comprising the reaction product of an isocyanate-terminated prepolymer comprising the reaction product of polyisocyanate, polyol, isocyanate-reactive compound comprising one or more ionic groups or potential ionic groups per molecule, at least one isocyanate chain terminating agent (such as monofunctional alcohols or amines), neutralizing agent that reacts with the isocyanate-reactive compound and a chain extending agent. The more volatile tertiary amines, for example those having a boiling point of less than 100° C., when used as neutralizing agents are taught to be advantageous, since the salts formed from these amines are capable of decomposing.

WO2017/042178A1 discloses a process for manufacturing an aqueous polyurethane dispersion. The process comprises an NCO-terminated polyurethane prepolymer formed from a reaction mixture comprising polyether polyol, anionic internal surfactant such as DMPA and aliphatic polyisocyanate such as IPDI in the absence of a tin-containing catalyst. N,N-dimethyl ethanol amine (DMEA) was added dropwise to neutralize the carboxyl groups of DMPA.

WO2017/137237A1 discloses a process for manufacturing an aqueous, organic solvent-free polyurethane dispersion. The process comprises an NCO-terminated polyurethane prepolymer formed from a reaction mixture comprising polyol, polyisocyanate, anionic stabilizer such as DMPA and at least one nonionic stabilizer comprsing at least two hydroxyl groups such as diols. The DMPA in the polyurethane prepolymer is neutralized by adding dropwise dimethylaminoethanol (DMAE).

CN111171272A discloses an aqueous polyurethane dispersion based on IPDI, PPG, sulfamate hydrophilic chain extender and a cationic end-capping reagent such as dimethyl ethanol amine (DMEA) or diethyl ethanol amine (DEEA).

Conventional aqueous polyurethane dispersions prepared according to a multi-step process with TEA as neutralizing agent are stable at pH 6.5 to 9. However, when pH drops below 6.5, the aqueous polyurethane dispersion is de-stabilized, as the polyurethane is left without stabilizing amine in the acidic environment. As a consequence, the polyurethane polymer will precipitate out of the dispersion and becomes useless.

Another disadvantage is, that the neutralizing agents such as the volatile TEA evaporates to the atmosphere when the aqueous polyurethane dispersion is dried. Thus, TEA becomes an air pollutant.

Glass fiber producers have long need for fiber glass size, based on aqueous polyurethane dispersion, with a fine particle size that can be used in both acidic and basic conditions which is not harmful for the environment. It was therefore an object to provide an aqueous polyurethane dispersion which overcomes the obstacles and drawbacks of the aqueous polyurethane dispersions of the prior art.

It was now surprisingly found that avoiding volatile neutralizing agents such as TEA and adding dialkylethanolamine such as dimethylethanolamine or diethylethanolamine to the polyurethane prepolymer forming step in the production process leads to the avoidance of VOC and, thus, air pollution is avoided. By adding dimethylethanolamine or diethylethanolamine to the polyurethane prepolymer forming step, dimethylethanolamine or diethylethanolamine reacts with the polyurethane prepolymer chain to form a, at least partially, DMEA-terminated polyurethane prepolymer and which acts as a non-volatile polymeric tertiary amine. This enables the production of aqueous polyurethane dispersions with fine particle size needed for fiber glass size. In addition, this aqueous polyurethane dispersion can maintain dispersion stability at pH 4.1 to 9+. Furthermore, the aqueous polyurethane dispersion is VOC-free and, thus, can be used without creating air pollution.

BRIEF SUMMARY OF THE INVENTION

It is an object of the present invention to provide an aqueous polyurethane dispersion and a process for preparing the same, a coating containing the same, and a coated article obtained by coating an article with the coating.

According to one aspect of the invention, there is provided a process for preparing an aqueous polyurethane dispersion provided in accordance with the present invention, comprising the steps of:

i) forming an NCO-terminated polyurethane prepolymer from a reaction mixture comprising of:
   a) at least one polyol,
   b) at least one anionic internal surfactant, wherein the at least one anionic internal surfactant comprises at least two NCO-reactive groups and at least one negatively charged functional group, preferably a carboxyl group,
   c) dimethylethanolamine or diethylethanolamine and
   d) at least one polyisocyanate, preferably at least one aliphatic, cycloaliphatic or aromatic di-or triisocyanate, wherein the at least one polyisocyanate is used in excess with respect to the molar ratio of the isocyanate groups to the NCO-reactive groups and hydroxyl groups of the other components of the reaction mixture,
ii) dispersing the polyurethane prepolymer into a continuous aqueous phase under application of shear forces, preferably by mechanical stirring, to obtain a prepolymer dispersion; and
iii) reacting the prepolymer dispersion with at least one chain extension agent to obtain an aqueous polyurethane dispersion, wherein steps i), ii) and iii) are carried out in the absence of an organic solvent.

According to another aspect of the invention, there is provided an aqueous polyurethane dispersion obtained by a process according to the present invention.

According to one other aspect of the invention, there is provided a composition comprising an aqueous polyurethane dispersion according to the present invention.

According to yet another aspect of the invention, there is provided a coating comprising an aqueous polyurethane dispersion provided in accordance with the present invention.

According to even another aspect of the present invention, there is provided a coated article comprising a glass fiber coated with a coating in accordance with the present invention.

According to still another aspect of the present invention, there is provided a use of an aqueous polyurethane dispersion according to the present invention in the manufacture of a coated article.

DETAILED DESCRIPTION OF THE INVENTION

Unless otherwise defined, all technical and scientific terms used herein have the same meanings as commonly understood by those skilled in the art. When the definition of a term in this specification conflicts with the meanings generally understood by those skilled in the art to which the invention pertains, the definitions described herein will prevail.

As used herein, "and/or" refers to one or all of the elements mentioned.

The article "a", "an" and "the" as used herein, means one or more than one (e.g. include the plural form), unless the context specifically states otherwise.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules.

As used herein, "including" and "comprising/containing" are intended to cover the circumstance in which there are only the mentioned elements, and the circumstance in which there are not only the mentioned elements but also other non-mentioned elements.

All ranges recited are inclusive and combinable.

All percentages in the present invention are by weight unless otherwise indicated.

The term "room temperature" refers to a temperature of 23° C.±2° C.

The term "polyurethane" or "polyurethane polymer" means a polymer having more than one urethane (—N(H)—C(O)—O—) and/or urea (—N(H)—C—(O)—N—) bond.

Because the structure of a polyurethane can be complex, the polyurethane described in the present invention will be discussed in terms of the various monomers that are used to form the polyurethane.

"NCO", as used herein, refers to the isocyanate group —N═C═O. "NCO-terminated", as used herein, relates to polyurethane prepolymers that contain at least one free NCO-group at one of their ends.

The carboxylate group of the present invention means —$COO^-$.

The carboxyl group of the present invention means —COOH.

Process for Preparing an Aqueous Polyurethane Dispersion

The present invention further relates to a process for preparing an aqueous polyurethane dispersion, comprising the steps of:

i) forming an NCO-terminated polyurethane prepolymer from a reaction mixture comprising of:
   a) at least one polyol,
   b) at least one anionic internal surfactant, wherein the at least one anionic internal surfactant comprises at least two NCO-reactive groups and at least one negatively charged functional group, preferably a carboxyl group,
   c) dimethylethanolamine and
   d) at least one polyisocyanate, preferably at least one aliphatic, cycloaliphatic or aromatic di- or triisocyanate, wherein the at least one polyisocyanate is used in excess with respect to the molar ratio of the isocyanate groups to the NCO-reactive groups and hydroxyl groups of the other components of the reaction mixture, ii) dispersing the polyurethane prepolymer into a continuous aqueous phase under application of shear forces, preferably by mechanical stirring, to obtain a prepolymer dispersion; and iii) reacting the prepolymer dispersion with at least one chain extension agent to obtain an aqueous polyurethane dispersion, wherein steps i), ii) and iii) are carried out in the absence of an organic solvent.

Step i)—Polyurethane Prepolymer Formation

In step i), an NCO-terminated polyurethane prepolymer is formed from a reaction mixture comprising of:

a) at least one polyol, b) at least one anionic internal surfactant, wherein the at least one anionic internal surfactant comprises at least two NCO-reactive groups and at least one negatively charged functional group, preferably a carboxyl group, c) dimethylethanolamine or diethylethanolamine and d) at least one polyisocyanate, preferably at least one aliphatic, cycloaliphatic or aromatic di- or triisocyanate, wherein the at least one polyisocyanate is used in excess with respect to the molar ratio of the isocyanate groups to the NCO-reactive groups and hydroxyl groups of the other components of the reaction mixture.

The polyurethane prepolymer formation reaction is typically performed at elevated temperature, preferably in the range of 55° C. to 105° C., more preferably in the range of 60° C. to 100° C., even more preferably in the range of 70° C. to 95° C., over a period of typically 1 to 24 hours, preferably 2 to 10 hours.

In a preferred embodiment, step i) is performed under agitation, more preferably at 100 rpm to 1,200 rpm, for example at 200 rpm.

The polyurethane prepolymer formation reaction is typically continued until the free isocyanate content (% NCO) reaches or comes very close to the calculated value, as determined by standard bromophenol blue titration with butylamine. Preferred values for the free isocyanate content in the polyurethane prepolymer are in the range from 1 wt. % to 10 wt. %, preferably 2.5 wt. % to 7 wt. % based on the total weight of the polyurethane prepolymer.

The obtained polyurethane prepolymer is typically in a solid state or in a liquid state, preferably in a liquid state.

The ionic groups present in the polyurethane prepolymer are converted to an ionic form by a partial or complete reaction with a tertiary amine of the polymeric tertiary amine simultaneously formed in-situ in step i).

Once the free isocyanate content reaches the predetermined value, as defined above, the temperature is typically reduced, for example to 75° C. to 90° C. At 60° C. or lower, the polyurethane prepolymer viscosity is too high to disperse and a poor particle size is produced.

In a preferred embodiment, the reaction mixture in step i) further comprises an organic antioxidant.

In another preferred embodiment, the reaction mixture in step i) further comprises a nonionic internal surfactant, preferably linear mono hydroxyl-functional polyethylene glycol monomethyl ether (methyl PEG; M-PEG). M-PEG stabilizes the aqueous polyurethane dispersion in the dispersing step ii) when shear force is applied.

In another embodiment, the polyurethane prepolymer formation reaction is carried out in the presence of a catalyst that is added, such as a metal-based catalyst, for example a tin-based catalyst, or an organic catalyst. In preferred embodiments of the invention, the reaction mixture only contains minor amounts of an organic catalyst or, even more preferred, does not comprises a catalyst as defined above at all.

Step—Dispersing in Water

In step ii), the polyurethane prepolymer obtained in step i) is dispersed into a continuous aqueous phase, under application of a shear force, to obtain an prepolymer dispersion.

The continuous aqueous phase is preferably water or a mixture of an external nonionic surfactant (for example Emulsogen® LCN 118) and water, more preferably a mixture of an external nonionic surfactant and water, without any organic solvent. The presence of an external nonionic surfactant supports the formation of a small particle size and therefore shear stability.

Step ii) is typically carried out at elevated temperature, preferably in the range of 30° C. to 80° C., more preferably in the range of 50° C. to 70° C., for example at 60° C.

The continuous aqueous phase is preferably added on top of the polyurethane prepolymer.

In preferred embodiments, the shear force is brought about by means of mechanical stirring, for example using a mechanical stirrer, at up to 2,000 rpm, preferably 200 rpm to 1,500 rpm and more preferably 800 rpm to 1,200 rpm, for example 1,000 rpm, over a period of typically 10 seconds to 10 minutes, preferably 1 to 5 minutes, for example 3 minutes, to form a water-in-oil dispersion.

In a preferred embodiment, the water-in-oil dispersion is mixed with water to form an oil-in-water dispersion.

Step—Chain Extension

In step iii), the isocyanate end-groups of the polyurethane prepolymer are reacted with at least one chain extension agent to obtain an aqueous polyurethane dispersion.

The chain extension agent contains at least two terminal NCO-reactive groups. Chain extension agents suitable for this invention are diamines, such as hydrazine, an alkylene diamine or cycloalkylene diamine or silane-containing diamine, preferably ethylene diamine (EDA), isophorone diamine, piperazine, or polyetheramine. Diols, such as an alkyldiol, including but not limited to 1,4-butanediol and 2-butyl-2-ethyl-1,3-propanediol, or water can also be used. The afore-mentioned chain extension reagents may also be combined with an endcapping reagent, such as a silane-containing amine, including, without limitation (3-aminopropyl)triethoxysilane (APTES). Silane-containing amines can further promote substrate adhesion.

The chain extension reaction is typically performed until essentially total conversion of the isocyanate groups, i.e. the chain extension agent is continuously added until free isocyanate groups are no longer detectable. It is generally preferred that the chain extension reaction is carried out until total conversion of the isocyanate groups. In one embodiment, up to 80% stoichiometric amount of chain extension agent is added to the prepolymer dispersion. The remaining free NCO-groups react with water. The conversion can be monitored by techniques well-established in the art, for example IR spectroscopy.

Step iii) is typically performed at room temperature.

In one preferred embodiment, step iii) is performed under agitation, more preferably at 100 rpm to 1,000 rpm, for example at 500 rpm.

The equivalent ratio of the two terminal NCO-reactive group of the chain extension agent of step iii) to the free isocyanate group (% NCO) of the polyurethane prepolymer is typically 40 mol % to 80 mol %, preferably 60 mol % to 80 mol %.

Steps i), ii) and iii) are preferably carried out in the absence of an organic solvent.

In another embodiment, step iii) is performed in the presence a catalyst and/or elevated temperature. Optionally, the aqueous polyurethane dispersion is degassed, preferably overnight.

Aqueous Polyurethane Dispersion (PUD)

An aqueous polyurethane dispersion is obtained by a process according to the invention as described herein.

In a preferred embodiment, the aqueous polyurethane dispersion comprises water.

In one embodiment, the aqueous polyurethane dispersion is an anionic nonionic polyurethane dispersion derived from an anionic compound, preferably DMEA and DMPA and a nonionic compound, preferably M-PEG.

The number-average molecular weight Mn of the polyurethane in the aqueous polyurethane dispersion is preferably 1,000 g/mol to 10,000 g/mol.

In a preferred embodiment, the aqueous polyurethane dispersion of the present invention, comprises no sulfur-containing compound, such as amino functional sulfonic acid (e.g. Vestamin® A 95; commercially available from Evonik).

In a preferred embodiment, the aqueous polyurethane dispersion of the present invention is free of volatile organic compounds (VOC) selected from the group consisting of triethylamine, dimethylcyclohexylamine, ethyldiisopropylamine, diethanolamine, triethanolamine, dimethylethanolamine, diethylethanolamine, methyldiethanolamine and aminomethylpropanol.

In another preferred embodiment, the aqueous polyurethane dispersion of the present invention is free of neutralizing agents selected from the group consisting of ammonia, sodium hydroxide, potassium hydroxide, lithium hydroxide and calcium hydroxide.

In another preferred embodiment, the aqueous polyurethane dispersion of the present invention is free of organic solvents selected from the group consisting of acetone, toluene, dipropylene glycol dimethyl ether (DPGDME) and N-methyl-pyrrolidone (NMP).

In a more preferred embodiment, the aqueous polyurethane dispersion of the present invention is free of volatile organic compounds (VOC) and free of organic solvents.

In a most preferred embodiment, the aqueous polyurethane dispersion of the present invention is free of volatile organic compounds (VOC), free of neutralizing agents and free of organic solvents.

The solid content of the aqueous polyurethane dispersion is preferably 20 wt. % to 70 wt. %, further preferably 30 wt. % to 65 wt. %, most preferably 35 wt. % to 60 wt. %, based on the total weight of the aqueous polyurethane dispersion, as determined by weighing the residues of a heated and dehumidified sample.

The viscosity is preferably in the range of 50 mPas to 10,000 mPas, preferably 100 mPas to 1,000 mPas, more preferably 200 mPas to 600 mPas and most preferred 250 mPas to 450 mPas, as determined by a Brookfield viscometer, spindle 4, 20 rpm. The viscosity is typically adjusted to suit the desired application form by adding a thickener. Suitable viscosity adjusting and thickening agents are well-known in the art.

The particle size is typically in the range of 50 nm to 1,000 nm, preferably in the range of 100 nm to 900 nm, more preferably 20 nm to 800 nm, even more preferably between 300 nm and 750 nm, most preferably between 500 nm and 700 nm as determined by dynamic light scattering (DLS).

Polyol

The at least one polyol of the reaction mixture of step i) of the process of the present invention is a non-functionalized polyol, i.e. contains no functional groups besides the hydroxyl groups. The polyol may comprise at least one polyether polyol and/or at least one polyester polyol. Preferably, the polyol comprises at least one polyether polyol and optionally at least one polyester polyol, at least one polycarbonate polyol, or a mixture of any two or more of the afore-mentioned polyols. Particularly preferred are polyether polyols or mixtures of at least one polyether polyol with one or more polyester polyols.

Polyether polyol suitable for the present invention described herein include a polyalkylene glycol homo- or copolymer, preferably a polypropylene glycol homo- or copolymer, a polyethylene glycol homo- or copolymer, a polytetramethylene ether glycol (poly(THF) or PTMEG) homo- or copolymer, or a polypropylenglycol/polyethyleneglycol block copolymer, or mixtures thereof. In various embodiments, the polyether polyol has a number average molecular weight Mn of 400 g/mol to 10,000 g/mol, preferably 500 g/mol to 3,000 g/mol.

Polyester polyols suitable for the present invention described herein include those that are obtainable by reacting, in a polycondensation reaction, dicarboxylic acids with polyols. The dicarboxylic acids may be aliphatic, cycloaliphatic or aromatic and/or their derivatives such as anhydrides, esters or acid chlorides. Specific examples of these are succinic acid, glutaric acid, adipic acid, pimelic acid, suberic acid, azelaic acid or sebacic acid, phthalic acid, isophthalic acid, trimellitic acid, phthalic acid anhydride, tetrahydrophthalic acid anhydride, glutaric acid anhydride, maleic acid, maleic acid anhydride, fumaric acid, dimeric fatty acid and dimethyl terephthalate. Examples of suitable polyols are monoethylene glycol, 1,2-propanediol, 1,3-propanediol, 1,4-butanediol, 3-methylpentane-1,5-diol, neopentyl glycol (2,2-dimethyl-1,3-propanediol), 1,6-hexanediol, 1,8-otaneglycol cyclohexanedimethanol, 2-methylpropane-1,3-diol, dithyleneglycol, triethyleneglycol, tetraethyleneglycol, polyethyleneglycol, dipropyleneglycol, polypropyleneglycol, polypropyleneglycol, dibutyleneglycol and polybutyleneglycol. Alternatively, they may be obtained by ring-opening polymerization of cyclic esters, preferably ε-caprolactone.

Polycarbonates suitable for the present invention described herein can be obtained by reaction of carbon acid derivatives, e.g. diphenyl carbonate, dimethyl carbonate or phosgene with diols. Suitable examples of such diols include ethylene glycol, 1,2- and 1,3-propanediol, 1,3- and 1,4-butanediol, 1,6-hexanediol, 1,8-octanediol, neopentyl glycol, 1,4-bishydroxymethyl cyclohexane, 2-methyl-1,3-propanediol, 2,2,4-trimethyl pentanediol-1,3-dipropylene glycol, polypropylene glycols, dibutylene glycol, polybutylene glycols, bisphenol A, tetrabromobisphenol A as well as lactone-modified diols. The diol component preferably contains 40 wt. % to 100 wt. % hexanediol, preferably 1,6-hexanediol and/or hexanediol derivatives. More preferably the diol component includes examples that in addition to terminal OH groups display ether or ester groups.

The hydroxyl polycarbonates should be substantially linear. However, they can optionally be slightly branched by the incorporation of polyfunctional components, in particular low-molecular polyols. Suitable examples include glycerol, trimethylol propane, hexanetriol-1,2,6, butanetriol-1,2,4, trimethylol propane, pentaerythritol, quinitol, mannitol, and sorbitol, methyl glycoside, 1,3,4, 6-dianhydrohexites.

Suitable polycarbonate polyols are, without limitation, those obtainable under the trademark names Desmophen® C3200 (Covestro) and Kuraray C2050 (Poly-(3-methyl-1,5-pentanediol, 1,6-hexanediol)carbonate; Kuraray).

The reaction mixture may further comprise monomeric diols, such as 1,4-butanediol.

The at least one polyol is preferably a polyether polyol.

In a more preferred embodiment, the polyol is polypropylene glycol (PPG) or a mixture comprising more than one PPG with various number average molecular weights.

In various embodiments, he number-average molecular weight of the polyol is preferably 400 g/mol to 5,000 g/mol, more preferably 500 g/mol to 3,000 g/mol, more preferably 800 g/molto 2,500 g/mol, most preferably 1,000 g/mol to 2,000 g/mol, determined at 40° C. by gel permeation chromatography using tetrahydrofuran as the mobile phase and polystyrene as the control standard. In an even more preferred embodiment, the polyol is a mixture of polypropylene glycols with a molecular weight of 400 g/mol to 500 g/mol, for example 425 g/mol and a molecular weight of 900 g/mol to 100 g/mol, for example 1,025 g/mol.

The amount of the polyol is preferably 10 wt. % to 90 wt. %, more preferably 10 wt. % to 80 wt. % and most preferably 40 wt. % to 70 wt. %, based on the total weight of the reaction mixture.

The hydroxyl functionality of the polyol is preferably 1 to 3, more preferably 1.8 to 2.4 and most preferably 2.0.

Anionic Internal Surfactant

The reaction mixture in step i) of the process according to the present invention further comprises at least one anionic internal surfactant, wherein the at least one anionic internal surfactant comprises at least two NCO-reactive group and at least one negatively charged functional group, preferably a sulfonic acid group or a carboxylic acid group and more preferably a carboxylic group.

The NCO-reactive group is preferably selected from the group consisting of hydroxyl groups, mercapto groups and amino groups, and more preferably, the NCO-reactive group is a hydroxyl group.

The sulfonic acid group or the carboxylic acid group can be used directly in the form of their salts, such as sulfonate or carboxylate.

In a more preferred embodiment, the anionic internal surfactant is a carboxyl group-containing anionic internal surfactant. The at least one anionic internal surfactant of the present invention is preferably selected from the group consisting of 2,2-bis(hydroxyalkyl)alkane monocarboxylic acids, in particular 2,2-bis(hydroxymethyl)alkane monocarboxylic acids with a total carbon atom number of 5-8 and amino acid. The amino acid is preferably one or more selected from the group consisting of lysine, 6-aminocaproic acid and proline.

A particularly preferred carboxylic group-containing anionic internal surfactant according to the present invention is selected from the group consisting of 2,2-bis(hydroxymethyl)propionic acid (dimethylol propionic acid; 2,2-dihydroxymethyl propionic acid; DMPA) or 2,2-dihydroxymethyl butyric acid.

In a most preferred embodiment of the present invention, the anionic internal surfactant is DMPA. DMPA is commercially available from Perstorp.

The anionic group of the aqueous polyurethane dispersions of the present invention are primarily derived from the anionic internal surfactant. The amount of the anionic internal surfactant is preferably 0.1 wt. % to 3 wt. %, based on the total weight of the reaction mixture.

Dimethylethanolamine (DMEA; DMAE) or Diethylethanolamine (DEEA)

The reaction mixture in step i) of the process according to the present invention further comprises dimethylethanolamine or diethylethanolamine. DMEA or DEEA acts as a chain terminating agent which limits the molecular weight of the polyurethane prepolymer formed.

The amount of DMEA or DEEA is more than 100% of the stoichiometric amount needed to neutralize the anionic internal surfactant, preferably 110% to 130%, for example 120%. The excess amount of DMEA or DEEA compensates the need in case the pH of the system decreases. DMEA or DEEA forms additional polymeric tertiary amine to stabilize the polyurethane.

DMEA or DEEA is typically added in one or more portions.

In a preferred embodiment, dimethylethanolamine is used.

Dimethylethanolamine is commercially available from Eastman under the tradename Amietol® M21 or at DSM under the trade name NeoRez® R-2005.

Polyisocyanate

The reaction mixture in step i) of the process according to the present invention further comprises at least one polyisocyanate. The polyisocyanate according to the present invention, is a compound represented by the general formula R(NCO)n, provided that R in the formula represents an organic compound-containing an arbitrary number of carbons, and n Any known compound can be used as the polyisocyanate and typical examples thereof include 1,4-tetramethylene diisocyanate, 1,6-hexamethylene diisocyanate (HDI), 1,12-dodecamethylene diisocyanate, cyclohexane-1,3- or 1,4-diisocyanate (CHD1), 1-isocyanato-3-isocyanatomethyl-3,5,5-trimethylcyclohexane (isophorone diisocyanate; IPDI), dicyclohexylmethane-4,4'-diisocyanate (hydrogenated MDI; HMDI), 2- or 4-isocyanatocyclohexyl-2'-isocyanatocyclohexylmethane, 1,3- or 1,4-bis-(isocyanatomethyl)-cyclohexane, bis-(4-isocyanato-3-methylcyclohexyl)methane, 1,3- or 1,4-a,a,a'a'-tetramethylxylylene diisocyanate, 2,4- or 2,6-toluene diisocyanate (TDI), 2,2'-, 2,4'- or 4,4'-methylene diphenyl diisocyanate (MDI), 1,5-naphthalene diisocyanate (NDI), p-phenylene diisocyanate (PPDI) or m-phenylene diisocyanate, and xylylene diisocyanate (XDI).

In a preferred embodiment, the at least one polyisocyanate of the reaction mixture in step i) is at least one aliphatic, cycloaliphatic or aromatic di- or triisocyanate.

In a more preferred embodiment, the at least one polyisocyanate is dicyclohexylmethane-4,4'-diisocyanate (H12MDI), isophorone diisocyanate (IPDI), 2,4- or 2,6-toluene diisocyanate (TDI) or hexamethylene diisocyanate (HDI), or mixtures thereof.

In an even more preferred embodiment, the at least one polyisocyanate is isophorone diisocyanate (IPDI) or hexamethylene diisocyanate (HDI) or mixtures thereof.

In a most preferred embodiment, the at least one polyisocyanate is IPDI. IPDI is commercially available from Covestro.

The at least one polyisocyanate of the reaction mixture in step i) is used in excess with respect to the molar ratio of the isocyanate groups to the NCO-reactive groups and hydroxyl groups (OH) of other components of the reaction mixture, i.e. in a concentration in excess of the stoichiometric concentration required to completely react with the hydroxyl groups.

The OH/NCO equivalent ratio preferably being 1:1.1 to 1:4, more preferably 1:1.5 to 1:2.5. Preferably, the amount of the polyisocyanate is 20% to 150% in excess of the stoichiometric concentration required to completely react with the hydroxyl groups.

The amount of polyisocyanate is preferably 5 wt. % to 70 wt. %, further preferably 5 wt. % to 40 wt. %, still further preferably 5 wt. % to 35 wt. %, most preferably 10 wt. % to 30 wt. %, based on the total weight of the reaction mixture.

Chain Extension Agent

The chain extension agent of the present invention comprises at least two NCO-reactive groups.

The chain extension agent is preferably selected from the group consisting of water, diol, mono-, di-, tri-functional amine and mono-, di-, tri-functional hydroxylamine.

The chain extension agent is more preferably hydrazine, an alkylene diamine, a cycloalkylene diamine, a silane-containing diamine, an alkyldiol, or a polyetherdiamine.

The chain extender is most preferably selected from the group consisting of ethylene diamine (EDA), hydrazine, water, isophoronediamine, adipic dihydrazide, diethylene triamine, diethanolamine, ethanolamine and N-(2-hydroxyethyl)-ethylene diamine.

In a preferred embodiment, the chain extender is a diamine, more preferably ethylene diamine. EDA is commercially available from BASF.

Additives

The aqueous polyurethane dispersions of the present invention may comprise further additives. Useful additives are antioxidants, stabilizers, surfactants, biocides and reaction diluents.

Antioxidant

The aqueous polyurethane dispersions of the present invention may comprise an antioxidant. An antioxidant suitable for the present invention is preferably one or more selected from the group consisting of a metallic carbamic acid compound, a phenolic antioxidant, an amine-type antioxidant and a heterocycle-type antioxidant, most preferably the phenolic antioxidant.

The amount of the organic antioxidant is preferably 0.06 wt. % to 2.0 wt. %, on a basis that the amount of the polyurethane is 100 wt. %.

The phenolic antioxidant is preferably one or more of the following: an alkyl hindered phenol, a multiring hindered phenol and an alkylthio hindered phenol.

In a preferred embodiment, the antioxidant is butylated hydroxytoluene (BHT). BHT is commercially available from Sasol.

Surfactant

In one embodiment of the present invention, the aqueous polyurethane dispersion comprises an external surfactant. In a preferred embodiment, the surfactant is an APE-free surfactant (Alkyl phenol ethoxylate free surfactant). In another embodiment, the surfactant is a nonionic surfactant. Typically known surfactants include for example Emulsogen® LCN-118, EPN 118, LCN 088, LCN 158, LCN 217, TS 200 (Clariant), Rhodasurf® BC 840, B1, BC-610 (Solvay), Genapol® LA 160, LA 070, T250 (Clariant) In a more preferred embodiment, the nonionic surfactant is selected from the group consisting of Emulsogen® LCN 118 (Clariant), Rhodasurf® BC 840 (Solvay) and Genapol® LA 160 (Clariant).

Composition

The present invention further relates to a composition comprising an aqueous polyurethane dispersion according to the present invention described herein.

The composition of the present invention as described herein is characterized that the composition is a coating, an adhesive, a sealant or a printing ink.

Coating

The present invention further relates to a coating comprising an aqueous polyurethane dispersion according to the present invention as described herein.

The coatings containing the aqueous polyurethane dispersion of the present invention described herein show excellent chemical resistance, good flexibility, excellent abrasion resistance and cohesive strength and excellent low temperature chip resistance, while being VOC-free and thus environmentally friendly. Coatings according to the present invention adhere to a wider range of substrates and can be formulated with additives to enhance properties.

Coated Article

The present invention further relates to an article, coated with the coating according to the present invention as described herein. In a preferred embodiment, the article is a glass fiber.

Use

The present invention further relates to the use of an aqueous polyurethane dispersion according to the present invention as described herein in the manufacture of a coated article.

Aqueous polyurethane dispersions of the present invention are useful for coating of glass fiber.

Further uses of the aqueous polyurethane dispersions of the present invention comprise coatings such as UV coating, floor coating, hygiene coating, leather coating, plastic coating, textile coating, non-woven coating, wood coating, adhesive, concrete coating, automotive coating, clear coating and anticorrosive applications.

It is understood that all embodiments disclosed herein in relation to the methods are similarly applicable to the disclosed dispersions, compositions, and uses and vice versa.

The following examples are given to illustrate the present invention. Because these examples are given for illustrative purposes only, the invention should not be deemed limited thereto.

EXAMPLES

Materials

Chemical Suppliers

- Arcot® PPG 1025 polyol; polypropylene glycol (PPG); Mn=1025 g/mol; (commercially available from Covestro)
- Arcot® PPG 425 polyol; polypropylene glycol (PPG); Mn=425 g/mol; CAS#25322-69-4; (commercially available from Covestro)

Fomrez® YA8-1 polyester polyol; (commercially available from LANXESS)

Polyglykol M2000S linear mono hydroxyl-functional polyethylene glycol monomethyl ether (methyl PEG; M-PEG); (commercially available from Clariant)

DMPA 2,2-dihydroxymethyl propionic acid; CAS #4767-03-7; (commercially available from Perstorp)

DMEA dimethylethanolamine (DMEA; N, N-Dimethylethanolamine); CAS #108-01-0; Amietol® M21; (commercially available from Eastman)

BHT antioxidant; butylated hydroxytoluene; (commercially available from Sasol)

Irganox® 1010 Pentaerythritol tetrakis(3-(3,5-di-tert-butyl-4-hydroxyphenyl)propionate); (commercially available from BASF)

IPDI diisocyanate; isophorone diisocyanate; CAS #4098-71-9; (commercially available from Covestro)

Desmodur® W diisocyanate; H12MDI; (commercially available from Covestro)

EDA chain extension agent; ethylene diamine; (commercially available from BASF)

Emulsogen® LCN-118 nonionic surfactant, C11 Oxo alcohol; HLB value=14; (commercially available from Clariant)

Genapol® LA 160 nonionic surfactant; (commercially available from Clariant)

TEA neutralizing agent; triethyl amine; CAS #121-44-8; b.p. 87° C.; (commercially available from Eastman)

Biocide MIT/BIT formulation; (commercially available from LANXESS under the tradename Preventol®)

Deionized water

Methods:

The measurements according to the present invention are carried out at 23+2° C. unless otherwise stated.

The solid content (% SC) of the aqueous polyurethane dispersion is measured by heating a known amount of a sample at elevated temperature until constant weight is attained. The residue on heating is used to calculate the % solid content.

The free isocyanate group (NCO) content in polyurethane prepolymers is determined by dissolving a sample in toluene to allow the unreacted NCO groups to react with excess of butyl amine. The remaining amine is then titrated with hydrochloric acid solution to a bromophenol blue end point.

The pH of the aqueous polyurethane dispersion is measured at 23° C. using a standard pH meter.

The viscosity of the aqueous polyurethane dispersion is measured by a Brookfield viscometer, spindle 4, 20 rpm.

The particle size of the aqueous polyurethane dispersion is measured via dynamic light scattering (DLS) using a Malvern 3000 Particle Size Analyzer.

For measuring the number-average molecular weight and the weight-average molecular weight of the polyurethane, a gel permeation chromatography is used. The aqueous polyurethane dispersion is coated on a polytetrafluoroethylene plate, and the coated plate is naturally dried at room temperature to obtain a dry film. An appropriate amount of dry film is weighed and dissolved in tetrahydrofuran at a concentration of 8 mg/mL. A test is performed with Agilent 1260 (column temperature=36° C., injection volume=60 EL. Flow rate=0.7 m L/min). The test result is obtained based on the polystyrene standard as control, and the fractions having molecular weights of 100 or higher are selected for the calculation.

Aqueous polyurethane dispersions are synthesized according to the following processes.

TABLE 1

Formulation of example 1 (inventive) using in-situ formed polymeric tertiary amine

| | wt. % | Composition [wt. %] | Solid [wt. %] | Volatile [wt. %] |
|---|---|---|---|---|
| Prepolymer | | | | |
| PPG 1025 | 54.726 | 26.268 | 26.268 | |
| PPG 425 | 7.732 | 3.711 | 3.711 | |
| Polyglykol M2000S | 1.738 | 0.834 | 0.834 | |
| DMPA | 0.659 | 0.317 | 0.317 | |
| DMEA | 0.52 | 0.253 | 0.253 | |
| BHT | 0.220 | 0.106 | 0.106 | |
| IPDI | 34.398 | 16.511 | 16.511 | |
| | 100 | | | |
| Dispersion | | | | |
| Prepolymer | 48 | | | |
| EDA | 1.685 | 1.685 | 1.685 | |
| Emulsogen ® LCN-118 | 3.206 | 3.206 | 3.206 | |
| Deionized water | 47.109 | 47.109 | | 47.109 |
| | 100 | 100.000 | 52.891 | 47.109 |

Aqueous Polyurethane Dispersion Production Process (Inventive)

The deionized water was split into a first water charge (15 wt. %) and a second water charge (85 wt. %). The first water charge (15 wt. %) was mixed with the nonionic surfactant Emulsogen® LCN-118 at 400 rpm and kept in 60° C. oven for 5 hours. In the following order, PPG 1025, PPG 425, Polyglykol M2000S, DMPA, DMEA, BHT and IPDI were charged to a flask to from a reaction mixture and agitated at 200 rpm at 75° C. for 5 hours to prepare a polyurethane prepolymer. The % NCO value of the polyurethane prepolymer was measured to verify the target % NCO. Based on the final % NCO of the polyurethane prepolymer, the amount of EDA to be added was determined.

Later, the dispersion process was carried out. The polyurethane prepolymer was agitated at an agitator speed of 1,000 rpm and the mixture of the first water charge and Emulsogen® LCN-118 was added to the polyurethane prepolymer. The mixture was agitated at 1,000 rpm for 3 minutes and the second water charge was added to form a prepolymer dispersion. The prepolymer dispersion was cooled in a cooling ice/water bath until the reaction mixture reached 30° C.

EDA, pre-diluted in 5× of the amount of water, was added and the mixture of prepolymer dispersion and chain extending agent is cooled to 25° C. at 500 rpm. Afterwards, agitate at 200 rpm for 24 hours. Finally, the aqueous polyurethane dispersion is discharged from the agitator and solid content (% SC), pH, viscosity and particle size was measured (as shown in Table 4).

TABLE 2

Formulation of example 2 (comparative) using TEA

| | wt. % | Composition [wt. %] | Solid [wt. %] | Volatile [wt. %] |
|---|---|---|---|---|
| Prepolymer | | | | |
| PPG 1025 | 54.775 | 26.292 | 26.292 | |
| PPG 425 | 7.739 | 3.715 | 3.715 | |
| Polyglykol M2000S | 1.64 | 0.787 | 0.787 | |

TABLE 2-continued

| Formulation of example 2 (comparative) using TEA | | | | |
|---|---|---|---|---|
| | wt. % | Composition [wt. %] | Solid [wt. %] | Volatile [wt. %] |
| DMPA | 0.66 | 0.317 | 0.317 | |
| BHT | 0.22 | 0.106 | 0.106 | |
| IPDI | 34.966 | 16.784 | 16.784 | |
| | 100 | | | |
| Dispersion | | | | |
| TEA | 0.239 | 0.239 | | 0.239 |
| Prepolymer | 48 | | | |
| EDA | 1.797 | 1.797 | 1.797 | |
| Emulsogen ® LCN-118 | 2.726 | 2.726 | 2.726 | |
| Deionized water | 47.238 | 47.238 | | 47.238 |
| | 100 | 100.000 | 52.523 | 47.477 |

Aqueous Polyurethane Dispersion Production Process (Comparison)

The deionized water was split into a first water charge (15 wt. %) and a second water charge (85 wt. %). The first water charge (15 wt. %) was mixed with nonionic surfactant Emulsogen® LCN-118 and kept in 60° C. oven for 5 hours. In the following order, PPG 1025, PPG 425, Polyglykol M2000S, DMPA, BHT and IPDI were charged to a flask to form a reaction mixture and agitated at 200 rpm at 75° C. for 5 hours. The % NCO value of the polyurethane prepolymer was measured to verify the target % NCO. Based on the final % NCO of the polyurethane prepolymer, the amount of EDA to be added was determined.

The next step was the neutralization of DMPA by adding TEA to the polyurethane prepolymer as a neutralizing amine and agitated for 30 minutes at 200 rpm at 75° C.

Later, the dispersion process was carried out. The polyurethane prepolymer was agitated at an agitator speed of 1,000 rpm and the mixture of the first water charge and Emulsogen® LCN-118 was added to the polyurethane prepolymer. The mixture was agitated at 1,000 rpm for 3 minutes and the second water charge was added to form a prepolymer dispersion. The prepolymer dispersion was cooled in a cooling ice/water bath until the reaction mixture reached 30° C.

EDA, pre-diluted in 5× of the amount of water, was added and the mixture of prepolymer dispersion and chain extending agent is cooled to 25° C. at 500 rpm. Afterwards, agitate at 200 rpm for 24 hours. Finally, the aqueous polyurethane dispersion is discharged from the agitator and solid content (% SC), pH, viscosity and particle size was measured (as shown in Table 4).

TABLE 3

| Formulation of example 3 (comparative) using DMEA | | | | |
|---|---|---|---|---|
| | wt. % | Composition [wt. %] | Solid [wt. %] | Volatile [wt. %] |
| Prepolymer | | | | |
| Fomrez ® YA8-1 | 74.408 | 40.560 | 40.560 | |
| DMPA | 1.321 | 0.720 | 0.720 | |
| Irganox ® 1010 | 0.404 | 0.220 | 0.220 | |
| Desmodur ® W | 23.867 | 13.010 | 13.010 | |
| | 100 | | | |
| Dispersion | | | | |
| Deionized water | 39.150 | | | |
| DMEA | 0.480 | 0.480 | | 0.480 |

TABLE 3-continued

| Formulation of example 3 (comparative) using DMEA | | | | |
|---|---|---|---|---|
| | wt. % | Composition [wt. %] | Solid [wt. %] | Volatile [wt. %] |
| Prepolymer | 54.510 | | | |
| EDA | 0.850 | 0.850 | 0.850 | |
| Genapol ® LA-160 | 4.960 | 4.960 | 4.960 | |
| Biocide | 0.050 | 0.050 | 0.005 | 0.045 |
| | 100.000 | 60.850 | 60.325 | 0.525 |

Aqueous Polyurethane Dispersion Production Process (Comparison):

In the following order, Fomrez® YA8-1, DMPA, Irganox® 1010 and H12MDI were charged to a flask to form a reaction mixture and agitated at 200 rpm at 85° C. for 3 hours. The % NCO value of the polyurethane prepolymer was measured to verify the target % NCO. Based on the final % NCO of the polyurethane prepolymer, the amount of EDA to be added was determined.

The next step was the neutralization of DMPA by adding DMEA. Deionized water and DMEA are charged to a vessel and stirred at 800 rpm. The polyurethane prepolymer is added to the mixture comprising water and DMEA and further stirred for 10-20 minutes to form a prepolymer dispersion.

EDA, pre-diluted in 5× of the amount of water, was added and the mixture of prepolymer dispersion and chain extending agent is stirred for 2 hours. Biocide dissolved in water was added and the mixture was further stirred for 1 hour.

TABLE 4

| Results | | | | | | |
|---|---|---|---|---|---|---|
| | Ex. 1* | Ex. 1* | Ex. 1* | Ex. 1* | Ex. 2 | Ex. 3 |
| Target % NCO | 6.21 | | | | 6.62 | 2.76 |
| Actual % NCO | 5.25 | | | | 6.63 | 2.8 |
| % SC | 53.28 | | | | 52.63 | 60 |
| pH | 7.18 | 6.1** | 5.1** | 4.12** | 6.62 | 8 |
| Viscosity [mPa*s] | 336 | 340 | 340 | 340 | 232 | 600 |
| Particle size [μm] | 0.614 | 0.566 | 0.565 | 0.577 | 0.627 | 1.69 |
| VOC [%] | 0 | 0 | 0 | 0 | 0.239 | 0.480 |

*inventive;
**adjust pH with 25% acetic acid

Table 4 shows that when subjected to lower pH environment (adjust pH with 25% acetic acid to pH 6.1, 5.1 and 4.12), the inventive example 1 remains stable and maintains comparable particle size at pH 7.18, while the comparison examples 2 and 3 precipitate at a pH of <6.5.

The inventive example 1 comprises non-volatile polymeric tertiary amine. The aqueous polyurethane dispersion of the present invention is free of VOC (e.g. free amines such as TEA or DMEA or solvents such as acetone or toluene). The VOC-free aqueous polyurethane dispersion has comparable % SC (solid content), pH, viscosity and particle size when compared with comparison example 2 and 3.

The non-volatile polymeric tertiary amine is synthesized simultaneously during the polyurethane prepolymer formation step by reacting dimethylethanolamine on the polyurethane prepolymer chain. Under acidic conditions such as pH 4, the polymeric amine remains part of the polymer chain.

And aqueous polyurethane dispersions remains stable at such low pH. Hence, the aqueous polyurethane dispersions is stable at pH 4.1 to 9+, which is favored as glass fiber size applications. Glass fiber producers do not have to flush their system when switch form alkali size to acidic size.

The inventive process provides an additional process improvement as, due to the addition of DMEA and, thus, due to the formation of polymeric tertiary amine in the prepolymer mixture in the prepolymer formation step i), a separate neutralization step can be avoided compared to the comparative process as shown in example 2.

What is claimed is:

1. A process for preparing an aqueous polyurethane dispersion, the process comprising:
- (i) forming an NCO-terminated polyurethane prepolymer from a reaction mixture comprising: (a) a polyol, (b) an anionic internal surfactant, (c) dimethylethanolamine or diethylethanolamine, and (d) polyisocyanate;
- (ii) dispersing the NCO-terminated polyurethane prepolymer into a continuous aqueous phase under application of shear forces, to obtain a prepolymer dispersion, the NCO-terminated polyurethane prepolymer not being subjected to neutralizing beyond with the dimethylethanolamine or diethylethanolamine (c) and a polymeric tertiary amine formed from the dimethylethanolamine or diethylethanolamine (c) in the forming (i); and
- (iii) reacting the prepolymer dispersion with a reagent comprising a chain extension agent, to obtain an aqueous polyurethane dispersion, wherein the forming (i), the dispersing (ii), and the reacting (iii) are carried out in the absence of an organic solvent, wherein the dimethylethanolamine or diethylethanolamine (c) is present in the reaction mixture in the forming (i) in a range of from 110 to 130% of a stoichiometric amount needed to neutralize the anionic surfactant (b), wherein the anionic internal surfactant comprises a first NCO-reactive group, a second NCO-reactive group, and a negatively charged functional group, and wherein the polyisocyanate is used in molar excess relative to moles of isocyanate groups to moles of the NCO-reactive groups and hydroxyl groups of other components of a reaction mixture in the forming (i).

2. The process of claim 1, wherein the polyol is a polyetherpolyol.

3. The process of claim 1, wherein the anionic internal surfactant comprises 2,2-bis(hydroxymethyl) propionic acid (DMPA) or 2,2-dihydroxymethyl butyric acid.

4. The process of claim 1, wherein the at polyisocyanate comprises dicyclohexylmethane-4,4'-diisocyanate (H12MDI), isophorone diisocyanate (IPDI), 2,4-toluene diisocyanate, 2,6-toluene diisocyanate (TDI), and/or hexamethylene diisocyanate (HDI).

5. The process of claim 1, wherein the dispersing (ii) comprises dispersing the polyurethane prepolymer into a continuous aqueous phase.

6. The process of claim 1, wherein the chain extension agent in the reacting (iii) comprises ethylene diamine (EDA), hydrazine, water, isophoronediamine, adipic dihydrazide, diethylene triamine, diethanolamine, ethanolamine, and/or N-(2-hydroxyethyl)-ethylene diamine.

7. The process or claim 1, wherein the reaction mixture in the forming (i) further comprises a nonionic internal surfactant.

8. An aqueous polyurethane dispersion (PUD), obtained by the process of claim 1.

9. The aqueous PUD of claim 8, which is free of organic solvents.

10. The aqueous PUD of claim 8, comprising no sulfur-comprising compound.

11. A composition, comprising:

the aqueous polyurethane dispersion of claim 8.

12. The composition of claim 11, which is a coating, an adhesive, a sealant, or a printing ink.

13. A coating, comprising;

the aqueous polyurethane dispersion of claim 8.

14. An article, comprising, coated thereon:

the coating of claim 13.

15. A coated glass fiber, comprising, coated thereon:

the coating of claim 13.

16. The process of claim 1, wherein the NCO-terminated polyurethane prepolymer is not subjected to neutralizing beyond with the polymeric tertiary amine formed from the dimethylethanolamine or diethylethanolamine (c) in the forming (i).

17. The process of claim 1, wherein ionic groups in the NCO-terminated polyurethane prepolymer are converted to an ionic form by at least partial reaction with a tertiary amine of the polymeric tertiary amine simultaneously formed in-situ in the forming (i).

18. The process of claim 1, wherein the dimethylethanolamine or diethylethanolamine (c) is present in the reaction mixture in the forming (i) in a range of from 120 to 130% of a stoichiometric amount needed to neutralize the anionic surfactant (b).

19. A process for preparing an aqueous polyurethane dispersion, the process comprising:
- (i) forming an NCO-terminated polyurethane prepolymer from a reaction mixture comprising: (a) a polyol, (b) an anionic internal surfactant, (c) dimethylethanolamine or diethylethanolamine, and (d) a polyisocyanate;
- (ii) dispersing the NCO-terminated polyurethane prepolymer into a continuous aqueous phase under application of shear forces, to obtain a prepolymer dispersion, any neutralizing of the NCO-terminated polyurethane prepolymer being achieved with no added neutralizing agent; and
- (iii) reacting the prepolymer dispersion with a reagent comprising a chain extension agent, to obtain an aqueous polyurethane dispersion, wherein the forming (i), the dispersing (ii), and the reacting (iii) are carried out in the absence of an organic solvent, wherein the dimethylethanolamine or diethylethanolamine (c) is present in the reaction mixture in the forming (i) in a range of from 110 to 130% of a stoichiometric amount needed to neutralize the anionic surfactant (b), wherein the anionic internal surfactant comprises a first NCO-reactive group, a second NCO-reactive group, and a negatively charged functional group, and wherein the polyisocyanate is used in molar excess relative to moles of isocyanate groups to moles of the NCO-reactive groups and hydroxyl groups of other components of a reaction mixture in the forming (i).

20. A process for preparing an aqueous polyurethane dispersion, the process comprising:
- (i) forming simultaneously an NCO-terminated polyurethane prepolymer and a polymeric tertiary amine from a reaction mixture comprising: (a) a polyol, (b) an anionic internal surfactant, (c) dimethylethanolamine or diethylethanolamine, and (d) a polyisocyanate;

(ii) dispersing the NCO-terminated polyurethane prepolymer into a continuous aqueous phase under application of shear forces, to obtain a prepolymer dispersion, ionic groups of the NCO-terminated polyurethane prepolymer being converted to ionic form by at least partial reaction with a tertiary amine of the polymeric tertiary amine formed in-situ in the forming (i); and (iii) reacting the prepolymer dispersion with a reagent comprising a chain extension agent, to obtain an aqueous polyurethane dispersion, wherein the forming (i), the dispersing (ii), and the reacting (iii) are carried out in the absence of an organic solvent, wherein the anionic internal surfactant comprises a first NCO-reactive group, a second NCO-reactive group, and a negatively charged functional group, and wherein the polyisocyanate is used in molar excess relative to moles of isocyanate groups to moles of the NCO-reactive groups and hydroxyl groups of other components of a reaction mixture in the forming (i).

* * * * *